No. 878,609.

PATENTED FEB. 11, 1908.

A. O. CARMAN.
TRANSMISSION GEARING.
APPLICATION FILED AUG. 2, 1907.

4 SHEETS—SHEET 1.

WITNESSES

INVENTOR
A. O. Carman
Attorney

No. 878,609.

PATENTED FEB. 11, 1908.

A. O. CARMAN.
TRANSMISSION GEARING.
APPLICATION FILED AUG. 2, 1907.

4 SHEETS—SHEET 3.

WITNESSES

INVENTOR

No. 878,609.
PATENTED FEB. 11, 1908.
A. O. CARMAN.
TRANSMISSION GEARING.
APPLICATION FILED AUG. 2, 1907.
4 SHEETS—SHEET 4.
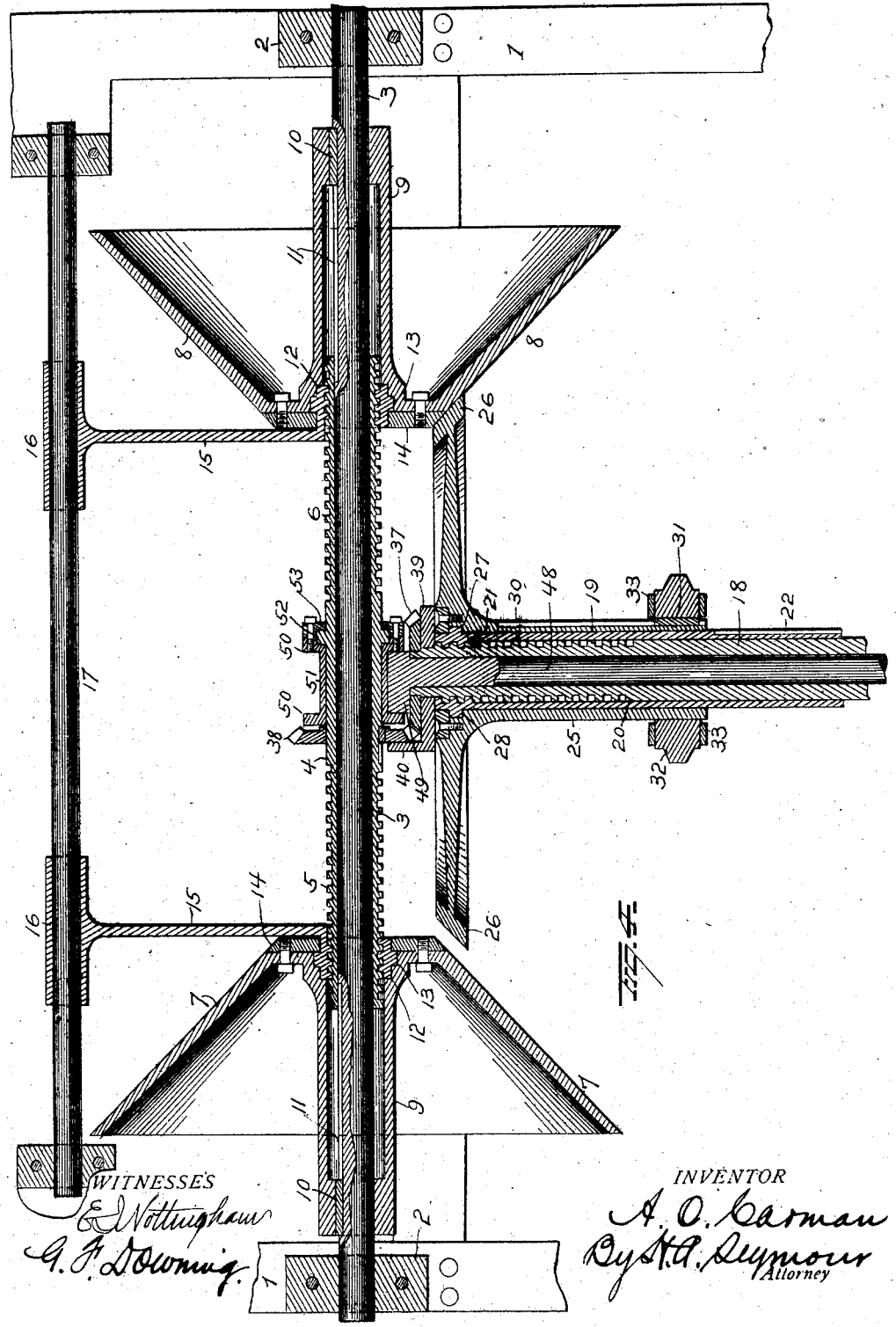
WITNESSES
INVENTOR

UNITED STATES PATENT OFFICE.

ALVIN O. CARMAN, OF HOMER, MICHIGAN.

TRANSMISSION-GEARING.

No. 878,609.  Specification of Letters Patent.  Patented Feb. 11, 1908.

Application filed August 2, 1907. Serial No. 386,850.

*To all whom it may concern:*

Be it known that I, ALVIN O. CARMAN, a resident of Homer, in the county of Calhoun and State of Michigan, have invented certain new and useful Improvements in Transmission-Gearing; and I do hereby declare the following to be a full, clear, and exact description of the invention, such as will enable others skilled in the art to which it appertains to make and use the same.

My invention relates to improvements in friction transmission gearing, and more particularly to such as are adaptable for propelling vehicles and boats,—one object of the invention being to so construct such gearing as to reduce wear between the parts and the loss of power to a minimum.

A further object is to provide, in such gearing, simple and efficient means whereby the speed of the driven shaft can be easily and quickly changed or varied within wide limits, and whereby the direction of rotation of said driven-shaft can be quickly reversed.

A further object is to so construct a friction transmission gearing employing cones on the driving shaft and a beveled wheel on the driven shaft, that said cones and beveled wheel can be moved simultaneously with relation to each other to change the speed of the driven shaft, and so that said cones can be moved relatively to the beveled wheel to reverse the direction of rotation of the driven-shaft.

With these objects in view the invention consists in certain novel features of construction and combinations of parts as hereinafter set forth and pointed out in the claims.

Figure 1:
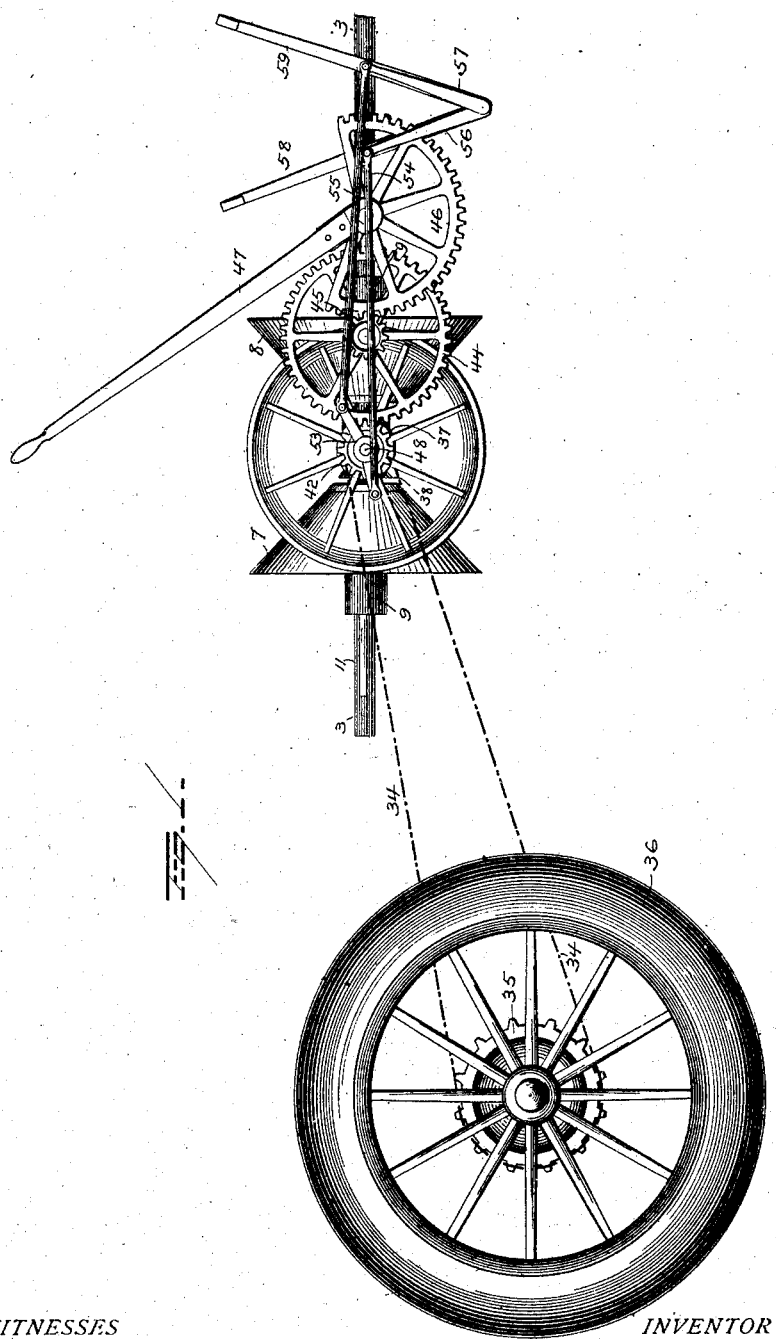
Figure 2:
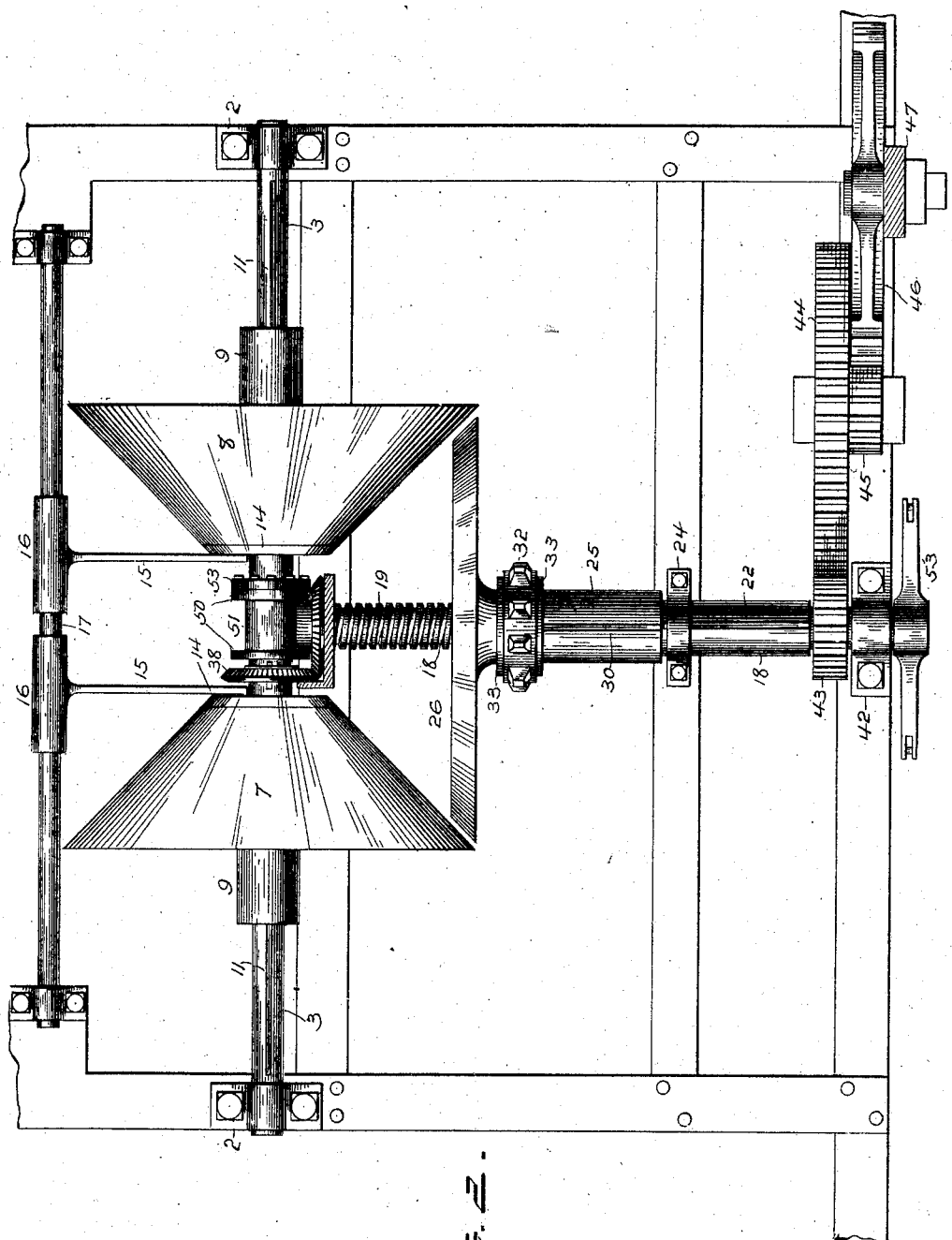
Figure 3:
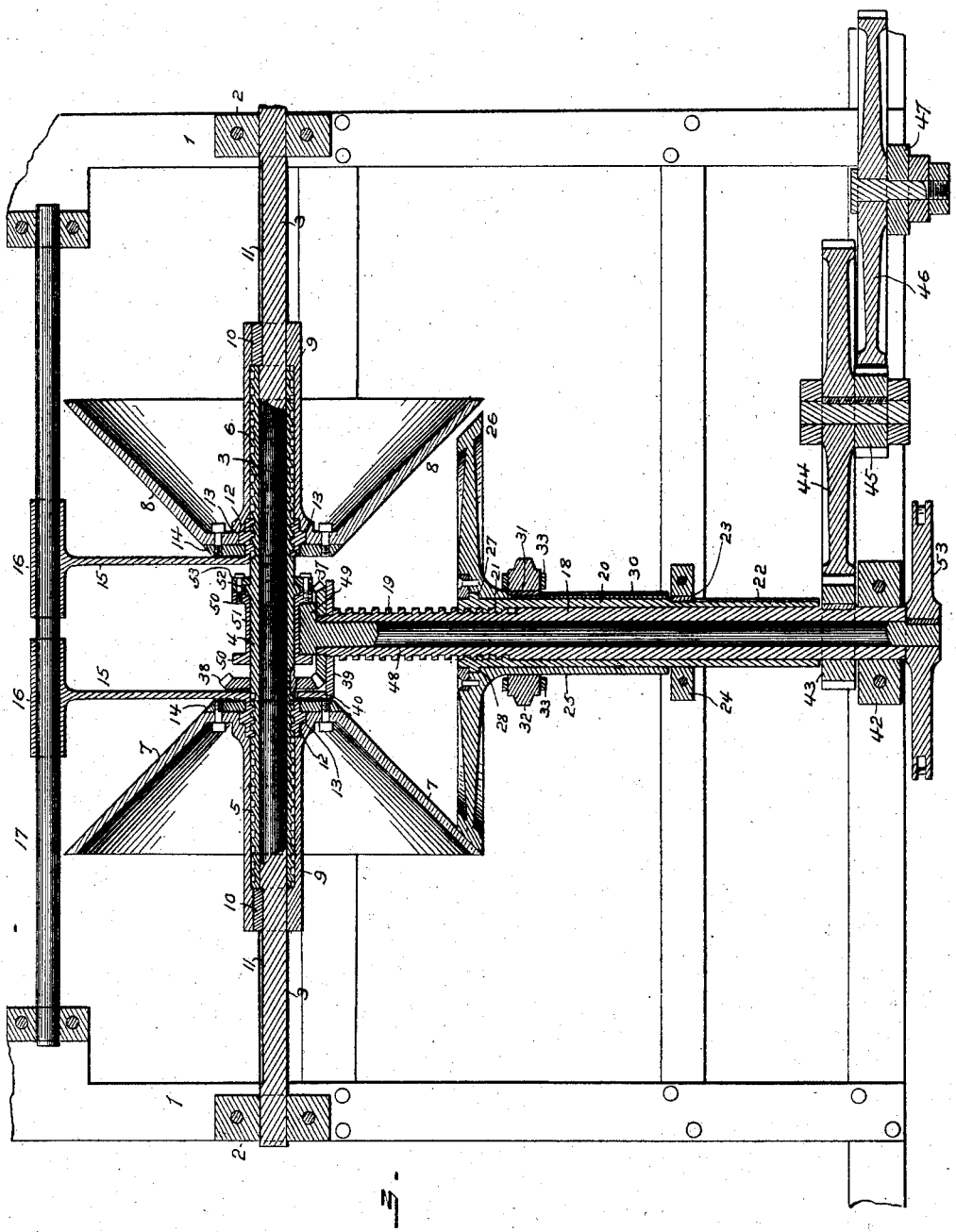

In the accompanying drawings, Figure 1 is a view in elevation illustrating my improvements. Fig. 2 is a plan view. Fig. 3 is a horizontal sectional view showing the relative positions of the parts for high speed, and Fig. 4 is a similar view showing the positions of the parts for low speed and for operating the driven-shaft in the reverse direction from that in which it will be operated with the arrangement of parts shown in Fig. 3.

1 represents suitable frame-work provided 
with bearings 2 for a driving shaft 3. Motion may be transmitted to this driving shaft from any suitable motor or engine (not shown) and in any desired manner.

A sleeve 4 is mounted upon the driving-shaft 3 and at the respective sides of its center this sleeve is provided with external, right and left handed screw threads 5, 6. Cones 7, 8 are located on the driving shaft 3 and provided with elongated hubs 9 having splines 10 in their outer portions to move in longitudinal grooves 11 in the driving-shaft 3. The hubs 9 of the cones are enlarged somewhat interiorly for the accommodation of the threaded portions of sleeve 4, and in the inner end of the hub of each cone, a nut 12 is located and adapted to mesh with the threads of sleeve 4. The nuts 12 are provided with annular flanges or collars 13 which enter recesses in the hubs of the cones. The nuts 12 are retained in proper position by means of plates 14 secured to the smaller ends of the cones. Rods or stems 15 project outwardly from the respective nuts 12 and are provided at their outer ends with sleeves 16 mounted to slide on a rod or shaft 17 secured at its ends to the framework. From this construction it will be seen that if the threaded sleeve 4 be rotated in one direction, the threaded portions thereof, coöperating with the nuts 12, will cause the cones 7, 8, to be moved on the shaft 3 away from each other in opposite directions and the sleeves 16, connected with the nuts 12, will slide on the rod or shaft 17. It is apparent that when the sleeve 4 is rotated in the reverse direction, the cones 7, 8, will be made to approach each other.

A tubular-shaft 18 is disposed at right angles to the driving shaft 3 in position to project between the cones 7, 8, and that portion of the tubular-shaft 18 which is between the cones 7, 8, is provided with external screw threads 19. The tubular shaft 18 passes through a sleeve 20 provided at its upper end with internal threads 21 which mesh with the threads 19 on the tubular shaft 18, and said sleeve 20 is also provided with an external-annular flange 27 which enters a recess 28 in the hub of a beveled friction wheel 26. Longitudinal movement of the tubular shaft 20 independently of the wheel 26 is prevented by a ring 29 secured to the wheel 26 and engaging one side of the annular flange 28.

The sleeve 20 passes through a bearing box 24 and the latter is provided with a spline 23 which enters a groove 22 in said sleeve 20 to prevent rotation of the latter but permits movement longitudinally of the tubular shaft 18, when the latter is turned.

The friction wheel 26, which is disposed between the cones 7 and 8, is provided with a tubular hub or extension 25 mounted to rotate on the sleeve 20, and this tubular hub or extension 25 constitutes the driven shaft of the gearing. This tubular driven shaft 25 is provided with an elongated groove 30 which receives a spline 31 in the hub of a sprocket wheel 32. In order to prevent lateral movement of the sprocket wheel, when the driven shaft is moved therethrough, arms 33 secured to the frame work, are disposed at respective sides of said sprocket wheel. A sprocket chain 34 passes over the sprocket wheel 32 and serves to transmit motion to a sprocket wheel 35 on the hub of a wheel 36, which may be one of the carrying wheels of an automobile.

One end of the tubular shaft 18 is provided with a pinion 37 which meshes with a similar pinion 38 splined to the sleeve 4 on the driving shaft 3.

A bracket 39 mounted on the tubular shaft 18, is provided with an arm 40 which serves to retain the pinion 38 in mesh with the pinion 37 when the sleeve 4 is moved longitudinally as hereinafter explained.

The outer end of the tubular shaft 18 is mounted in a bearing 42 on the frame work, and adjacent to this bearing, a pinion 43 is keyed to said tubular shaft. A gear wheel 44 transmits motion to the pinion 43, and a pinion 45 keyed to rotate with the gear wheel 44, receives motion from a mutilated gear or segment 46. A lever 47 is secured to the segmental gear 46 for operating the same. By these means, motion can be transmitted to the tubular shaft 18 for rotating the latter in one direction or the other. When the tubular shaft 18 is thus rotated in one direction, the coöperation of its threaded portion with the threaded or nut portion 21 of the sleeve 20, will cause the friction wheel 26 to move in a direction toward the driving shaft 3 and the smaller ends of the cones 7—8. When the tubular shaft is rotated as above explained, motion will be transmitted, by the pinions 37—38 to the sleeve 4, and the coöperation of the threaded portions of this sleeve, with the nuts 12, will cause the cones 7—8 to move in opposite directions away from each other, simultaneously with the movement of the friction wheel 26 toward the smaller ends of said cones. Assuming that the friction wheel 26 is in contact with one of the cones, the speed transmitted from said cone, through the friction wheel 26, to the driven shaft, will be gradually diminished as the friction wheel approaches the smaller end of the cone—such movement of the friction wheel being permitted, by the simultaneous outward movement of the cones as above described. It is apparent that if the lever 47 be moved in the reverse direction, the tubular shaft 20 will be so rotated as to cause an outward movement of friction wheel toward the larger ends of the cones and a simultaneous movement of the cones toward each other, and thus gradually increase the speed of the driven shaft.

The extreme positions of the friction gearing for high and low speed, are shown in Figs. 3 and 4 respectively.

It now remains to explain the means whereby the mechanism is operated to reverse the direction of rotation of the driven shaft. For this purpose, a shaft 48, passing through the tubular shaft 18, is provided at its inner end with a cam head 49, disposed between the flanges 50 of a collar 51 located on the sleeve 4. An annular flange 52 on the sleeve 4 enters an annular recess in the collar 51 and a recessed ring 53 encircling the sleeve 4 and secured to the collar 51, bears against one side of the annular flange 52. The collar 51 is thus prevented from movement longitudinally with the sleeve 4. By rotating the shaft 48, the coöperation of the cam head 49 with the collar 51, will cause the sleeve 4 to be moved longitudinally, and the cones to be moved bodily in the same direction so as to cause one or the other of said cones to engage the friction wheel 26, or to occupy such position that neither cone will engage the friction wheel, in which latter case, no motion will be transmitted to the driven shaft. To provide simple and efficient means for operating the shaft 48 to control the starting, stopping and reversing of the mechanism, a cross head 53 is secured to the outer end of said shaft 48, and its respective ends are connected, by rods 54, 55 with pivoted arms 56, 57, with which foot levers 58—59 are connected.

Various changes might be made in the details of construction of my invention without departing from the spirit thereof or limit its scope and hence I do not wish to limit myself to the precise details herein set forth.

Having fully described my invention what I claim as new and desire to secure by Letters Patent, is:—

1. In a transmitting gearing, the combination with a driving shaft and a driven shaft, of cones on the driving shaft, a friction wheel on the driven shaft between said cones, means for moving said cones in opposite directions and for simultaneously moving the friction wheel to change the speed of the driven shaft, and means for shifting the cones simultaneously in the same direction for starting, stopping and reversing the operation of the driven shaft.

2. In a transmitting gearing, the combination with a driving shaft and a driven shaft, of cones on the driving shaft, a friction wheel on the driven shaft between the cones, threaded devices connected with said cones for moving them simultaneously in opposite directions, screw devices connected with the friction wheel, and means for simultaneously operating all of said screw devices to shift the relation of the cones and the friction wheel to each other to change the speed of the driven shaft.

3. In a transmitting gearing, the combination with a driving shaft and a driven shaft, of cones on the driving shaft, a beveled friction wheel on the driven shaft between the cones, and a cam device for shifting the cones longitudinally to cause one or the other or neither of said cones to engage the friction wheel for starting, reversing or stopping the driven shaft.

4. In a transmitting gearing, the combination with a driving shaft and a driven shaft, of cones mounted on the driving shaft to rotate therewith, a sleeve mounted on the driving shaft and having right and left hand threaded connection with the respective cones, a friction wheel on the driven shaft, a threaded shaft having threaded connection with the friction wheel, means for rotating said threaded shaft and gearing between the threaded shaft and threaded sleeve.

5. In a transmitting gearing, the combination with a driving shaft and a driven shaft, of cones mounted on the driving shaft, a friction wheel on the driven shaft between said cones, a sleeve on the driving shaft and having threaded connection with the cones, means for rotating said sleeve to move the respective cones simultaneously in opposite directions, means for sliding said sleeve to move the cones simultaneously in the same direction, and means for shifting the friction wheel in a direction at right angles to the axis of the cones.

6. In a transmitting gearing, the combination with a driving shaft and a driven shaft, of cones mounted to slide on the driving shaft, a friction wheel on the driven shaft between the cones, a sleeve mounted on the driving shaft and having right and left hand screw threaded portions, nuts mounted in said cones and meshing with the threaded portions of the sleeve, arms on said nuts, sleeves on said arms, a shaft on which said last mentioned sleeve can slide, means for turning said sleeve to shift the cones, and means for shifting the friction wheel in a direction at right angles to the axis of the cones.

7. In a transmitting gearing, the combination with a driving shaft and a driven shaft, of cones mounted to rotate with and slide upon the driving shaft, a friction wheel on the driven shaft between the cones, means for simultaneously shifting said cones and friction wheel and changing the speed of the driven shaft, a flanged collar connected with the cones, a shaft provided with a cam head entering between the flanges of said collar, a cross head secured to said shaft, and means connected with said cross head, for turning said shaft to shift both cones in the same direction relatively to the friction wheel.

8. In a transmitting gearing, the combination with a driving shaft, a driven shaft, cones mounted to rotate with and slide on the driving shaft, and a friction wheel on the driven shaft between said cones, of a sleeve or tubular shaft on the driving shaft and having right and left hand threaded portions connected with the respective cones, a sleeve or tubular shaft concentric with the axis of the driven shaft and having a threaded portion connected with the friction wheel, gearing between said threaded shafts or sleeves, gearing connected with the threaded shaft or sleeve with which the friction wheel is connected, and means for operating said last mentioned gearing.

In testimony whereof I have signed this specification in the presence of two subscribing witnesses.

ALVIN O. CARMAN.

Witnesses:
A. OSBORN,
CLAUDE E. MARSHALL.